3,476,525
PRODUCTION OF BORON CARBIDE FLAKES
Lloyd R. Allen, Belmont, Mass., assignor to National Research Corporation, Newton, Mass., a corporation of Massachusetts
Filed Sept. 26, 1966, Ser. No. 581,791
Int. Cl. B01j 17/30; C01b 31/30
U.S. Cl. 23—294    3 Claims

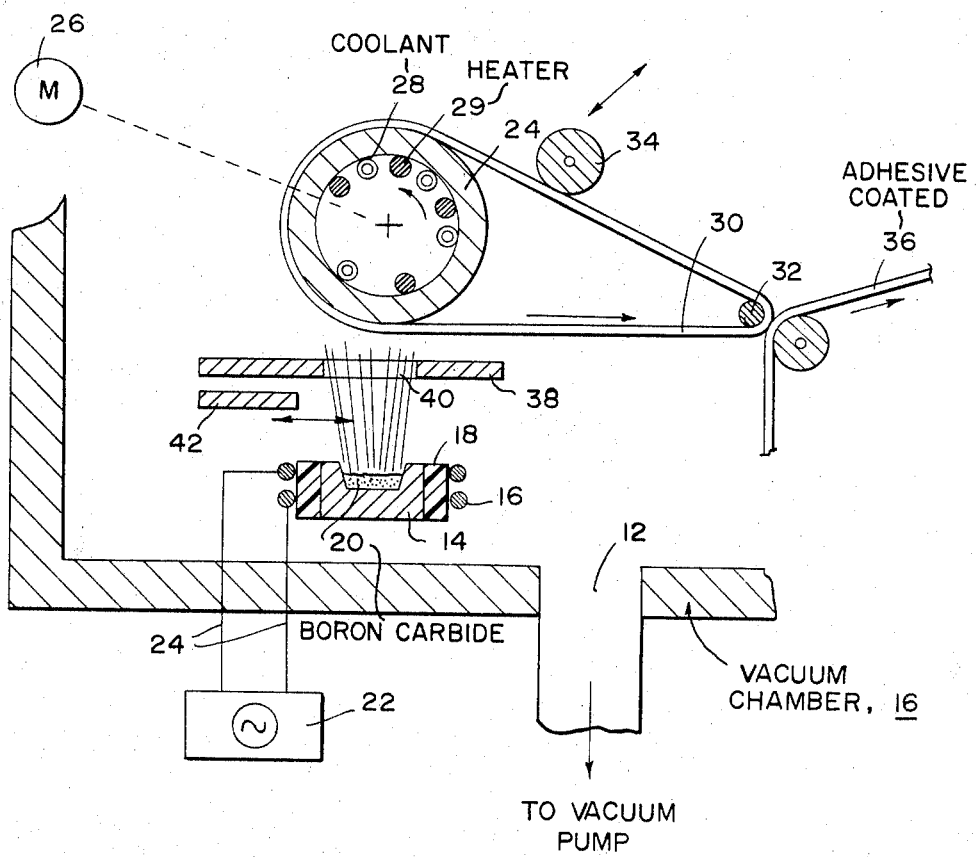

ABSTRACT OF THE DISCLOSURE

Boron carbide flake for use in composite reinforcement is made by vacuum depositing first and second layers of boron carbide on a flexible substrate and flexing the coated product causing the second layer to fall off the product in flake form.

---

This invention relates to the production of boron carbide in flake form.

Boron carbide material has utility as a reinforcing material for structural composites due to its high strength and modulus in relation to its weight. One form of boron carbide for composites is a flake construction which can be incorporated in an adhesive matrix of metal or polymeric material. Flake can also be incorporated in laminates, the individual flakes being arranged within the laminae in jigsaw puzzle fashion.

Boron carbide flake can be produced by vacuum depositing a film directly on a common, flexible substrate such as H film or aluminum or stainless steel and flexing the film to flake off boron carbide. Evaporation on refractory metal substrates such as tungsten, as disclosed in my copending aplication S.N. 524,615 filed Feb. 1, 1966 and flexing also produces satisfactory flake.

I have now discovered a new method for producing flake with substantially greater thickness and greater reliability in area units especially suited for composite applications. The method involves vaccum depositing a strike coat of boron carbide on a flexible substrate and then vacuum depositing a thick coat of boron carbide (e.g. from an induction or electron beam heated source) which can be removed as flake by flexing. In this case the strike coat acts as a barrier rather than the adhesive usually afforded through undercoats. The resultant product can be a much thicker flake, on the order of several mils and having a length to width ratio between 1 and 3 with lengths on the order of ¼ to 1 inch. The new process operates essentially free of the spalling and excessive variation in product yield and area dimensions which begin to affect the prior art methods as very thick deposits (in excess of 1 mil) are formed.

Reference should be made to the single figure of the drawing which is a schematic representation of an apparatus suitable for practicing the invention.

The apparatus comprises a vacuum chamber wall a portion of which is shown at 10. An exit port 12 in the vacuum chamber wall leads to vacuum pumps. Within the chamber is mounted (on a tripod stand) a graphite crucible 14. Surrounding the crucible is an induction coil 16 and a fibrous carbon insulating blanket 18. A charge 20 of boron carbide is contained in the crucible. An 8600 c.p.s. R.F. generator 22 is mounted outside the chamber and connected to the induction coil via insulated leads 24 passing through the chamber wall. A substrate supporting roller 24 is mounted in the chamber. The roller comprises a 14 inch diameter copper drum driven by a motor 26 from outside the chamber 10. The inner surface of the roller drum is traced by coolant flow coils 28 and heater elements 29.

The substrate comprises an endless belt 30 of ½ mil H-film. A flexing roller 32 of one inch diameter is provided for removal of flake and an adjustable guide roller 34 is provided for controlling belt tension.

A useable and preferred apparatus for collecting flake is simply a collection trough located below flexing roller 32. However, another means of collecting flake is through an adhesive-coated collection belt 36 which picks up the flake as a laminae useful in forming laminates. However, a separate chamber and sealed passage between chamber 10 and the separate chamber should be provided to prevent the adhesive on the collection belt from evaporating in the coating zone.

A mask 38 with an aperture 40 protects the substrate from extraneous coating and heat radiation and a shutter 42 is moved in front of the aperture during periods of crucible warm-up.

In operating the apparatus, the charge 20 is initially outgassed by heating to 2300° C. under a vacuum of about $1 \times 10^{-4}$ mm. Hg with the shutter 42 blocking aperture 40. Motor 26 runs roller 24 up to a high speed to provide a linear belt speed on the order of 10 feet per minute. Then power to the heater 16 is adjusted as necessary to achieve evaporation from the charge 20 and shutter 42 is moved aside to allow one pass of the belt wherein it is coated with a minimum thickness continuous film of boron carbide—less than about .05 mil and greater than about .001 mil. Then the shutter is moved in front of aperture 40 and motor 26 is slowed to reduce belt speed to less than a foot per minute. The shutter is then moved aside and a very thick second layer of boron carbide (¼ to 5 mils depending on power, substrate-source distance and substrate speed) is deposited on the substrate. As the substrate passes over roller 32, the flexure causes the flake to part completely over its full thickness and in large area segments as described above.

Generally no heating or cooling is applied to drum 24 and under these conditions the belt floats to a temperature on the order of 200° C. This can be modified or held constant, if desired, through heating or cooling the drum. It is desirable to hold the substrate above ambient for cleanliness and temperatures of 150° C. to 200° C. appear to be best for this purpose.

Once the first layer release coat of boron carbide has been formed, the deposition of the second layer and removal by flexure can be repeated cyclically to provide an extended production run.

Since variations of the above-described method can be made without departing from the scope of the invention herein involved, it is intended that all matter contained in the above description shall be interpreted as illustrative and not in a limiting sense.

What is claimed is:
1. A method producing boron carbide flake with a length-width ratio between 1 and 3 for use in composites and the like comprising the steps of (a) vacuum depositing a first layer of boron carbide on a flexible substrate, (b) vacuum depositing a second layer of boron carbide over the first layer, (c) bending the substrate to dislodge the second layer in flake form, said first layer formed in step (a) being deposited to a thickness of less than about 0.05 mil and more than about 0.001 mil to insure a continuous coating.

2. The process of claim 1 wherein the steps (b) and (c) are cyclically repeated to provide extended production of boron carbide flake.

3. The process of claim 1 wherein the second layer formed in step (b) is formed to a thickness in excess of about .001 inch.

(References on following page)

References Cited

UNITED STATES PATENTS

| | | | |
|---|---|---|---|
| 1,897,214 | 2/1933 | Ridgway | 23—59 X |
| 1,987,576 | 1/1935 | Moers. | |
| 2,996,783 | 8/1961 | Mayer | 23—294 X |
| 3,094,395 | 6/1963 | Richardson | 23—294 |
| 3,111,461 | 11/1963 | Hickman | 23—294 X |
| 3,334,967 | 8/1967 | Bourdeau. | |
| 3,389,022 | 6/1968 | Kravitz. | |
| 3,398,013 | 8/1968 | Krochmal et al. | |
| 3,183,563 | 5/1965 | Smith | 117—107.1 |

FOREIGN PATENTS 2,328,776  4/1963  France.

WILBUR L. BASCOMB, Jr., Primary Examiner

F. E. DRUMMOND, Assistant Examiner

U.S. Cl. X.R.

23—59, 208; 117—107